No. 870,200.  
PATENTED NOV. 5, 1907.

W. R. SHECKLER.  
ANGLE PIPE COUPLING.  
APPLICATION FILED DEC. 16, 1905.

WITNESSES  
INVENTOR

UNITED STATES PATENT OFFICE.

WILDER R. SHECKLER, OF GREENVILLE, PENNSYLVANIA.

ANGLE-PIPE COUPLING.

No. 870,200.  Specification of Letters Patent.  Patented Nov. 5, 1907.

Application filed December 16, 1905. Serial No. 292,062.

*To all whom it may concern:*

Be it known that I, WILDER R. SHECKLER, a citizen of the United States, residing at Greenville, in the county of Mercer and State of Pennsylvania, have invented certain new and useful Improvements in Angle-Pipe Couplers; and I do hereby declare the following to be a full, clear, and exact description of the invention, such as will enable others skilled in the art to which it appertains to make and use the same.

The object of this invention is to provide a simple and efficient pipe-coupling for connecting sections of pipe at an angle, and in such manner as to form fluid-tight expansion or slip-joints allowing contraction and expansion of the pipes without affecting the joint; the invention being applicable either to pipes of the same or different sizes, and of particular utility for joining contiguous pipe-sections for oil lines and water mains.

Figure 1:
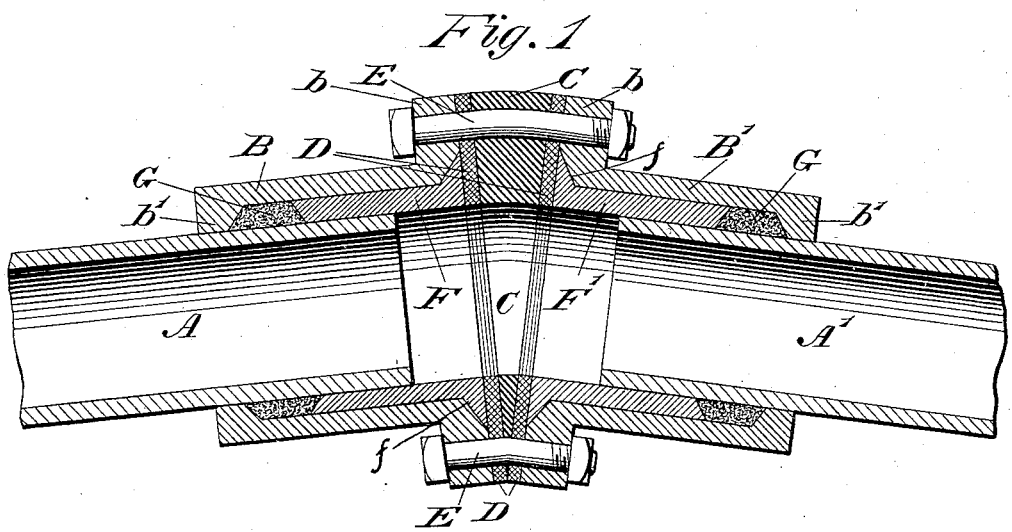
Figure 2:
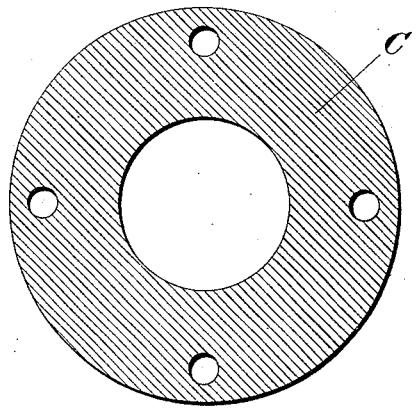

In the accompanying drawings, which form a part of this specification, and represent one preferred form or embodiment of my invention: Figure 1 is a central longitudinal section of a pipe-coupling and contiguous ends of adjacent pipe-sections, which are joined at an angle thereby. Fig. 2 is a detail view of an annular wedge employed between the coupling-members.

A particular explanation of the illustrated construction is as follows: The ends of the pipe-sections A and A' are respectively fitted with the coupling-sleeves B and B', whose confronting or adjacent ends are provided with external circumferential flanges b. These coupling-sleeves abut against opposite sides of the annular wedge C, packing-rings D being interposed between said wedge and the confronting faces of the coupling-sleeves; and by means of the fastening bolts E, inserted through suitable spaced apertures therefor in the wedge and in the flanges b of the coupling-sleeves, the parts are secured tightly together, thereby connecting the pipe-sections A and A' at an angle, and the packing-rings D being clamped between the opposite inclined sides of the annular wedge C and the confronting faces of the flanged coupling-sleeves B and B', so as to seal the joint. The wedge C may be of any desired thickness, according to the desired angle at which the pipes are to be connected, it being intended to employ a number of interchangeable wedges of different widths and inclinations, for coupling the pipes at various angles. The fastening bolts E are shown bent or curved through the wedge C, but straight in the flanges b of the coupling-sleeves. The bolt-holes in said flanges b are preferably drilled out at right-angles to the faces of the flanges, so that if both flanges were brought directly face to face the bolt-holes thereof would all register or coincide; while the bolt-holes in the annular body of the wedge are curved to coincide with the bolt-holes of the confronting faces of both flanges of the two coupling-sleeves. The said coupling-sleeves are shown having tubular body portions of larger internal diameter than the external diameters of the pipes, and having internal annular ribs or shoulders b' at their outer or farthermost ends, fitting closely around the pipes. Within the respective coupling-sleeves B and B' are fitted packing-sleeves or glands F and F'. These slip over the ends of the respective pipes A and A', fitting snugly around the same, and in the annular spaces between said glands and the annular ribs or shoulders b', suitable packing material G is placed, the same being compressed around the pipes when the glands are forced back, so as to make perfectly fluid-tight expansion or slip-joints, the contiguous ends of the pipe-sections A and A' terminating back of the confronting ends of the glands, which slip over the ends of said pipe-sections as aforesaid. The said packing glands F and F' are preferably formed with front annular flanges or shoulders f, having their rear or outer sides beveled, the same occupying counterformed annular seats or depressions therefor in the confronting faces of the coupling-sleeves, so that when the glands are forced home their inner faces are flush with the faces of the coupling-sleeves and abut against the packing-rings D, compressing the same against the opposite sides of the interposed wedge C. Thus a thoroughly efficient angle coupling is provided, making a perfect fluid-tight joint, and allowing provision for expansion and contraction by means of the telescopic connection between the adjacent pipe-sections and their respective coupling-sleeves B and B'. Should the pipe-sections or either one of them be of smaller external diameter than required to fit closely within the annular ribs or shoulders b' of the coupling-sleeves, then instead of gland F or F', as the case may be, a shorter but thicker gland may be fitted over the end of the particular pipe-section, and a separate packing-ring may be fitted over the pipe-section within the coupling-sleeve and against its outer or rear annular rib or shoulder b', and the packing material G may be compressed between such substitute gland and additional packing-ring, which is well understood, so that specific illustration thereof is deemed unnecessary. By this means, the device is applicable to the coupling of pipes either of the same or different diameters.

Having thus fully described my invention, what I claim as new and desire to secure by Letters Patent of the United States is:

1. An angle pipe-coupling comprising confronting coupling-sleeves which fit on the adjacent ends of contiguous pipe-sections, the said coupling-sleeves having external flanges at their inner or front ends, an annular wedge interposed between the flanges of said coupling-sleeves, and bent fastening bolts for securing the parts together, the bolt-holes therefor being formed in the flanges substantially at right-angles to the confronting faces thereof and being bent in the wedge to coincide with the bolt-holes of the flanges at both sides of the wedge.

2. An angle pipe-coupling comprising confronting coupling-sleeves, each having an external front flange and an internal annular shoulder at its rear or outer end, the said coupling-sleeves adapted to fit over the adjacent ends of contiguous pipe-sections, packing glands fitted in said sleeves and adapted to fit over the ends of said pipe-sections, the front or inner ends of said glands having external flanges fitting in annular depressions therefor in the confronting faces of the coupling-sleeves, packings arranged in the annular spaces between the rear ends of the glands and the said internal annular shoulders of the coupling-sleeves, an annular wedge interposed between the confronting faces or flanges of the coupling-sleeves, flat packing-rings interposed between the opposite faces of said wedge and the flush confronting faces of the coupling-sleeves and glands, and fastening bolts entered through the flanges of the coupling-sleeves and through the wedge binding the parts together.

In testimony whereof I affix my signature, in presence of two witnesses.

WILDER R. SHECKLER.

Witnesses:
SAMUEL J. ORR,
NETTIE SAUL.